United States Patent
Layne

(10) Patent No.: US 10,368,256 B2
(45) Date of Patent: Jul. 30, 2019

(54) MONITORING OPERATIONAL CAPABILITY OF A MOBILE COMMUNICATION DEVICE IN A NETWORK

(71) Applicant: Eagle Technology, LLC, Melbourne, FL (US)

(72) Inventor: Dennis Layne, Forest, VA (US)

(73) Assignee: Eagle Technology, LLC, Melbourne, FL (US)

( * ) Notice: Subject to any disclaimer, the term of this patent is extended or adjusted under 35 U.S.C. 154(b) by 129 days.

(21) Appl. No.: 15/823,380

(22) Filed: Nov. 27, 2017

(65) Prior Publication Data

US 2019/0166509 A1 May 30, 2019

(51) Int. Cl.
*H04W 24/02* (2009.01)
*H04W 24/08* (2009.01)

(52) U.S. Cl.
CPC .......... *H04W 24/02* (2013.01); *H04W 24/08* (2013.01)

(58) Field of Classification Search
CPC ... H04W 72/1215; H04W 76/50; H04W 4/10; H04W 4/16; H04W 8/18; H04W 24/02; H04W 24/04; H04W 24/08; H04W 88/06; H04W 48/18; H04L 69/18; H04L 69/67; H04L 69/36; H04L 43/08; H04L 43/0811; H04L 43/0823; H04L 29/06068
See application file for complete search history.

(56) References Cited

U.S. PATENT DOCUMENTS

| | | | | |
|---|---|---|---|---|
| 8,526,947 B1* | 9/2013 | Shahaf | ............. | H04W 52/0216 455/435.1 |
| 8,874,097 B1* | 10/2014 | Warsaw | ................ | H04W 88/06 455/418 |
| 9,295,020 B2 | 3/2016 | Ericson et al. | | |
| 2012/0172031 A1* | 7/2012 | Marocchi | ............ | H04W 72/005 455/422.1 |
| 2013/0157708 A1* | 6/2013 | Economy | .............. | H04W 48/18 455/518 |
| 2013/0170439 A1* | 7/2013 | Anderson | ......... | H04W 72/1215 370/329 |
| 2013/0337771 A1* | 12/2013 | Klein | ...................... | H04W 4/90 455/411 |
| 2014/0148115 A1* | 5/2014 | Ibbotson | ............... | H04W 24/04 455/404.1 |
| 2014/0304711 A1* | 10/2014 | Tennant | .................... | G06F 9/50 718/104 |
| 2015/0119075 A1* | 4/2015 | Thompson | ............ | H04W 64/00 455/456.1 |

(Continued)

*Primary Examiner* — Hoang-Chuong Q Vu
(74) *Attorney, Agent, or Firm* — Fox Rothschild LLP; Robert J. Sacco; Carol E. Thorstad-Forsyth

(57) ABSTRACT

A mobile communication device (MCD) in a network uses a land mobile radio (LMR) transceiver to facilitate voice communications through an LMR network to a dispatch center. A broadband cellular network (BCN) wireless modem in communication with the MCD implements a BCN wireless communication protocol for broadband data communications between the MCD and a remote dispatch center. When a BCN access interruption occurs, the MCD will automatically communicate to the remote dispatch center a notification of the BCN access interruption, by using the LMR network, and data otherwise communicated through the BCN is automatically communicated through the LMR network.

20 Claims, 6 Drawing Sheets

(56) References Cited

U.S. PATENT DOCUMENTS

| | | | |
|---|---|---|---|
| 2016/0226937 A1* | 8/2016 | Patel | H04L 65/4061 |
| 2018/0176005 A1* | 6/2018 | Bockrath | H04L 9/002 |
| 2018/0278504 A1* | 9/2018 | Alazraki | H04L 43/0823 |
| 2019/0034157 A1* | 1/2019 | Steinberg | G06F 3/165 |
| 2019/0082304 A1* | 3/2019 | Bestor | H04W 4/10 |

* cited by examiner

MONITORING OPERATIONAL CAPABILITY OF A MOBILE COMMUNICATION DEVICE IN A NETWORK

FIELD

This document relates generally to communication systems. More particularly, this document relates to systems and methods for monitoring an operational capability of a remote station in a variable network environment.

BACKGROUND

Land mobile radio (LMR) refers to a class of wireless communications that is designed for terrestrial communications between users. LMR systems are commonly arranged to facilitate communications capability for users in vehicles (using mobile radio transceivers) or on foot (using portable radio transceivers). LMR radio systems often involve at least one dispatch or command center which communicates with mobile and/or portable users through an LMR network.

LMR radio systems are increasingly migrating toward digital radio communication system architectures that offer various advantages as compared to conventional analog systems. One example of a well-known digital radio system architecture is Project 25 (P25). This architecture was developed by the Association of Public Safety Communications Officials International (APCO), the National Association of State Telecommunications Directors (NASTD), certain Federal Agencies, and the National Communications System (NCS). The P25 standard is made available through the Telecommunications Industry Association (TIA). Another example of a digital radio system architecture for LMR is Terrestrial Trunked Radio (TETRA). The TETRA standard for digital radio communications was developed by the European Telecommunications Standardization Institute (ETSI).

Although an LMR network such as P25 has many advantages, these systems remain primarily a narrowband service for voice communications. They are not considered cost effective for multimedia applications such as video. However, it is known that a Long Term Evolution (LTE®) network (e.g., an LTE network operating in the 700 Mhz range) can be overlaid upon an LMR network to allow LMR network users to benefit from the speed and low latency for which such networks are well known. Such an approach can facilitate a unified infrastructure that combines the strengths of both types of networks. As is known, the LTE standard for high-speed wireless communication is based on the GSM/EDGE and UMTS/HSPA technologies.

To facilitate such combined networks, manufacturers of mobile radios have begun offering equipment that combine digital LMR (e.g., P25) and LTE capabilities in a single integrated portable or mobile radio unit. Such devices offer the capability of high-speed data with robust LMR voice operation in a common ruggedized package.

SUMMARY

The present disclosure concerns a method for monitoring an operational capability of a mobile communication device (MCD) in a network. The method involves using a land mobile radio (LMR) transceiver implementing a LMR wireless communication protocol to facilitate at least narrowband voice communications for the MCD through an LMR network when communicating with a remote dispatch center. A broadband cellular network (BCN) wireless modem in communication with the MCD is used for implementing a BCN wireless communication protocol to facilitate at least broadband data communications between the MCD and the remote dispatch center. In some scenarios, the LMR wireless communication protocol can be selected from the group consisting of P25 and TETRA. Optionally, these systems can be arranged to implement a trunking communication protocol. In some scenarios the BCN wireless communication protocol can be selected to be LTE.

Under certain conditions, a BCN access interruption may occur wherein the broadband data communication through the BCN is temporarily not possible for the MCD. When this condition occurs, the MCD will automatically communicate to the remote dispatch center a notification of the BCN access interruption, by using the LMR network. Information concerning the occurrence of the BCN access interruption can be displayed on a display screen at a dispatch center responsive to receiving the notification. Accordingly, a dispatcher will be notified of the BCN access interruption.

According to one aspect, when a BCN access interruption is detected by the MCD, the MCD will automatically temporarily store in a data storage or memory accessible to the MCD at least one of audio and video media data that has been received by the MCD. This data will subsequently be automatically communicated to the BCN wireless modem for transmission to a dispatch center when data communication capability through the BCN is restored.

According to another aspect, the BCN will facilitate data communications necessary for at least one low data rate MCD application executing on the MCD when the BCN is accessible. For example, the at least one low data rate MCD application can be selected from the group consisting of an internet protocol (IP) voice application, an IP video application, a text messaging application, a form generator application, and a report generator application. The MCD will automatically use the LMR network to facilitate data communications for the at least one low data rate MCD application upon occurrence of the BCN access interruption as described herein.

According to another aspect, the MCD can utilize the LMR network in place of the BCN network to report GPS location information to the remote dispatch center under a condition where the BCN access interruption has occurred. Likewise, the MCD can be configured to use the LMR network in place of the BCN network to report vehicle on-board diagnostic data to at least one remote maintenance facility server under a condition where the BCN access interruption.

The present disclosure also concerns a mobile communication device (MCD). An MCD as described herein includes at least one land mobile radio (LMR) wireless communication circuit configured for implementing an LMR wireless communication protocol. The MCD also includes at least one electronic processor which is configured to utilize the at least one LMR wireless communication circuit to facilitate at least narrowband voice communications for the MCD through an LMR network when communicating with a remote dispatch center. The electronic processor can also be configured to cause the MCD to utilize a BCN wireless modem. The BCN wireless modem is in communication with the MCD, and is configured to implement a BCN wireless communication protocol to facilitate at least broadband data communications between the MCD and the remote dispatch center. The processor is responsive to a determination of an occurrence of a BCN access interruption wherein the broadband data communication through the BCN wireless modem is temporarily not possible for the MCD. In such scenarios, the processor will automatically cause the MCD to communicate to the remote dispatch center a notification of the BCN access interruption, by using the LMR network.

DETAILED DESCRIPTION OF THE DRAWINGS

The present solution will be described with reference to the following drawing figures, in which like numerals represent like items throughout the figures.

Figure 4A:
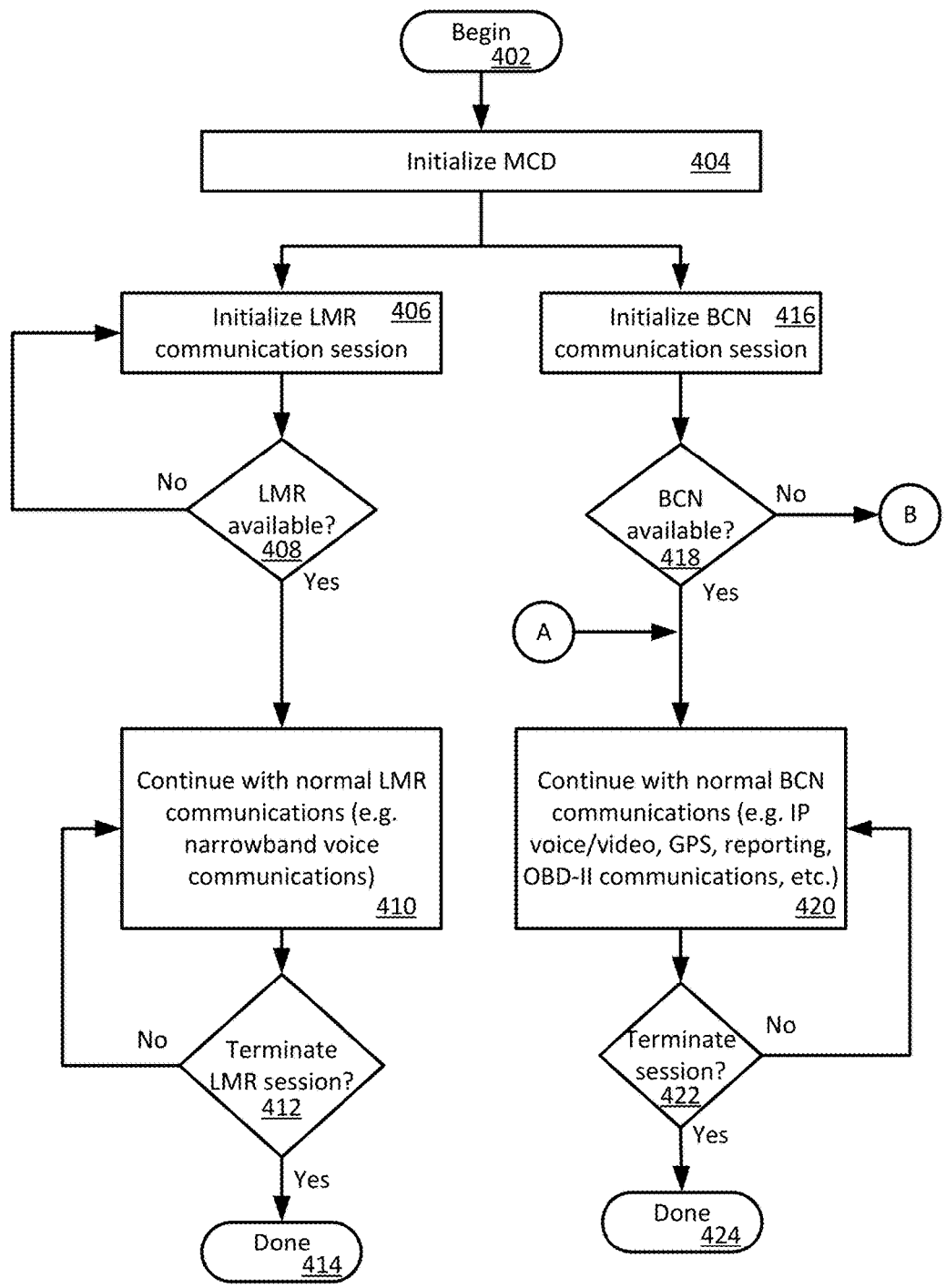
Figure 4B:
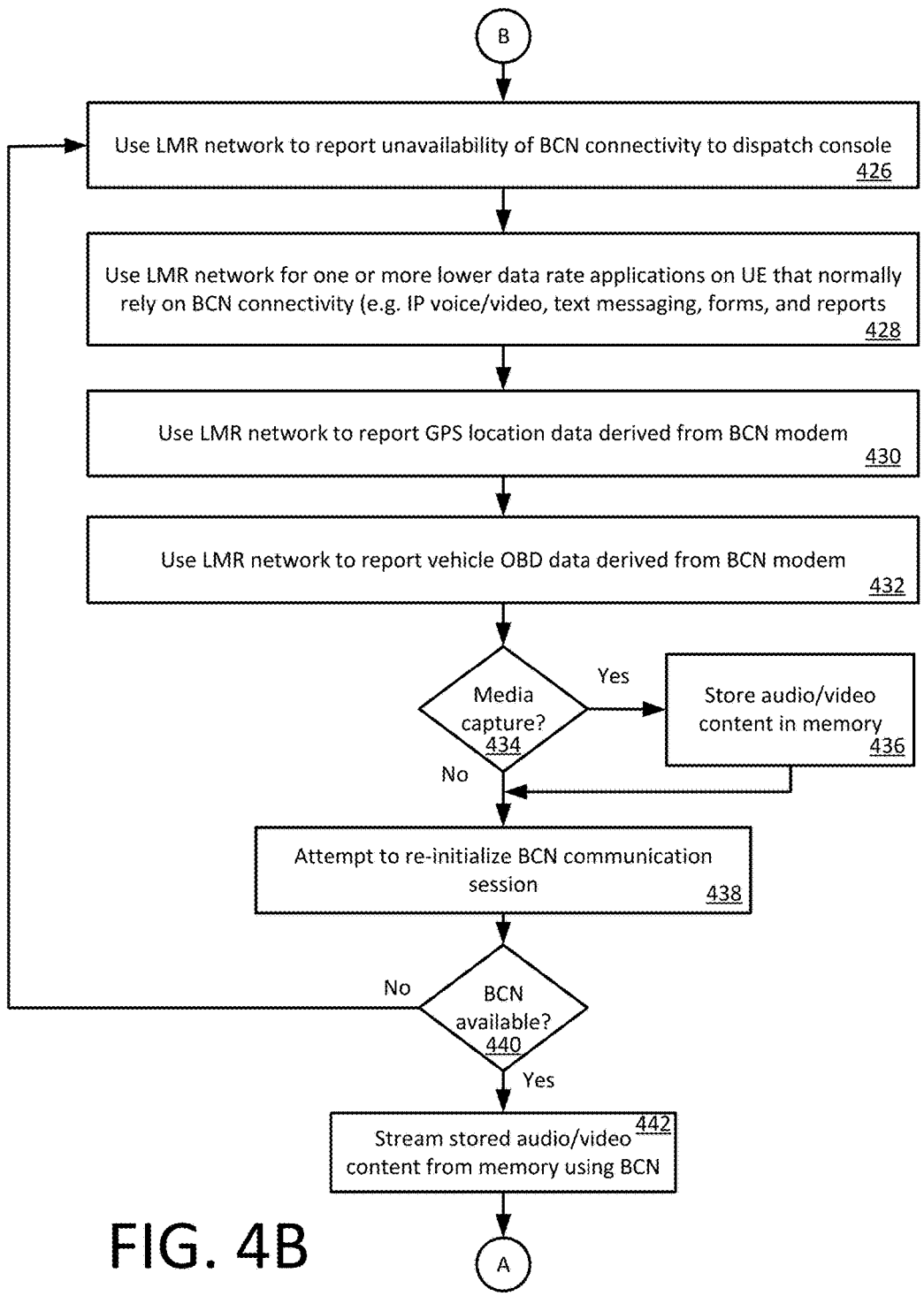

FIGS. 4A and 4B collectively comprise a flowchart that is useful for understanding the solution presented herein.

Figure 5:
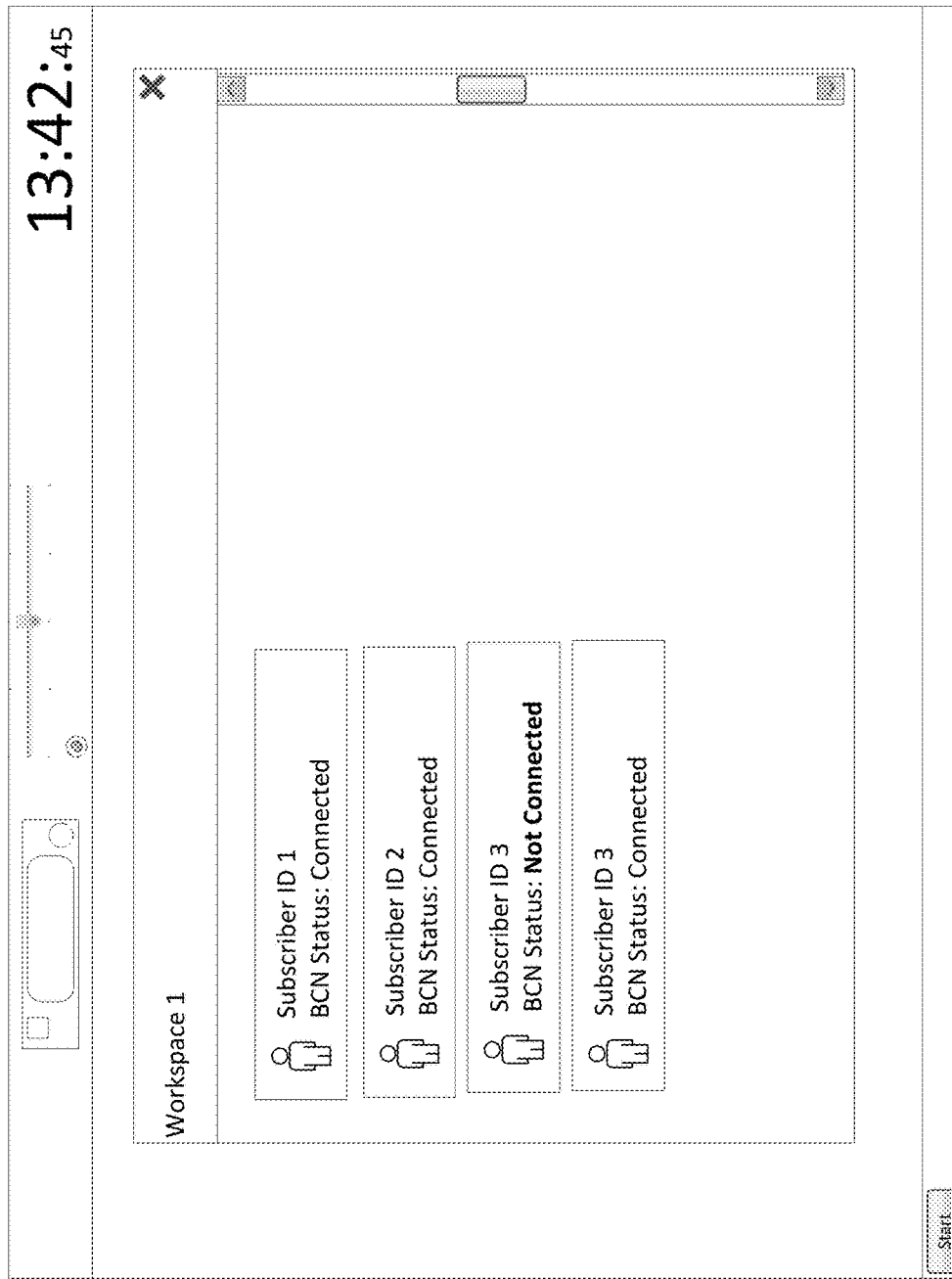

FIG. 5 is an exemplary screen display at a dispatch center which is useful for understanding how a dispatcher or incident commander can be notified concerning BCN connectivity.

DETAILED DESCRIPTION

It will be readily understood that the features and components as generally described herein and illustrated in the appended figures could be arranged and designed in a wide variety of different configurations. Thus, the following more detailed description as represented in the figures, is not intended to limit the scope of the present disclosure. While the various aspects of the disclosure are presented in drawings, the drawings are not necessarily drawn to scale unless specifically indicated.

The disclosure provided in this document is to be considered in all respects only as illustrative and not restrictive. The scope of the disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the systems and methods disclosed herein may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the invention.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

A conventional cellular broadband communication network (BCN), such as an LTE network, can be overlaid upon an LMR network. This arrangement allows LMR network users to benefit from the speed and low latency for which BCNs are well known. The approach can facilitate a unified infrastructure that combines the strengths of both types of networks. To facilitate such combined networks, manufacturers of mobile radios have begun offering multi-network equipment that includes both digital LMR (e.g., P25) and BCN (e.g., LTE) capabilities integrated into a single portable or mobile radio unit (sometimes referred to herein as mobile communication device or MCD). Such multi-network devices offer the capability of high-speed data with robust LMR voice operation in a common ruggedized package.

LTE connectivity can be important to facilitate the functionality of high data rate applications such as video. But system signal coverage is different for a LMR network as compared to a BCN. In some instances, MCDs having multi-network capability can have can have LMR signal coverage in a particular geographic location, but may not have BCN signal coverage. This leads to some problems because an incident commander or dispatcher will not know at any given moment whether a MCD located in particular geographical location has broadband communication capability provided by the BCN.

A solution to this problem involves utilizing the high reliability LMR network to report when a MCD is lacking broadband connectivity due to absence of BCN coverage in a particular place and time. A modem card in the MCD (or a modem external of the MCD) includes an interface to connect to the MCD. By using this interface, and a simple communication protocol, the modem can report the status of the BCN connection. This information would then be available at the MCD, which can report the status of the BCN connection to an incident commander or dispatch console operator for enhanced situational awareness. This situational awareness information will allow the commander or dispatcher to quickly visualize which MCDs possess BCN connectivity.

The status of the BCN connection can also be utilized as a basis for controlling certain functions at the MCD. For example, the presence or absence of BCN connectivity can be used as a basis for determining whether video and/or audio should be temporarily stored at the MCD rather than streaming such data over the BCN. If the audio/video data is stored, then it can optionally be communicated to the incident commander or dispatch console operator at some later time when BCN connectivity has been reestablished.

By alerting the LMR radio that BCN connectivity is lacking, the LMR functionality provided at the MCD can function as a fallback capability when needed. Such a fallback capability can be useful for lower data-rate applications that usually rely on the BCN for services such as text messaging, IP voice/video calls, forms and reports. Many aftermarket BCN modems (e.g., LTE Vehicle modems) are known to provide additional status information that can be communicated back to dispatchers or incident commanders using the BCN. Examples of such status information include location information derived from an on-board Global Positioning System (GPS) receiver, and vehicle status information. Such vehicle status information can be derived by an interface to an on-board diagnostics (OBD) system linked to the vehicle. For example, OBD-II is a known system that uses an onboard computer in a vehicle to provide selfdiagnostic and reporting to a vehicle owner or repair technician. When appropriate, such OBD-II vehicle status information can be sent back to commanders or dispatchers using the LMR communication network.

Figure 1:
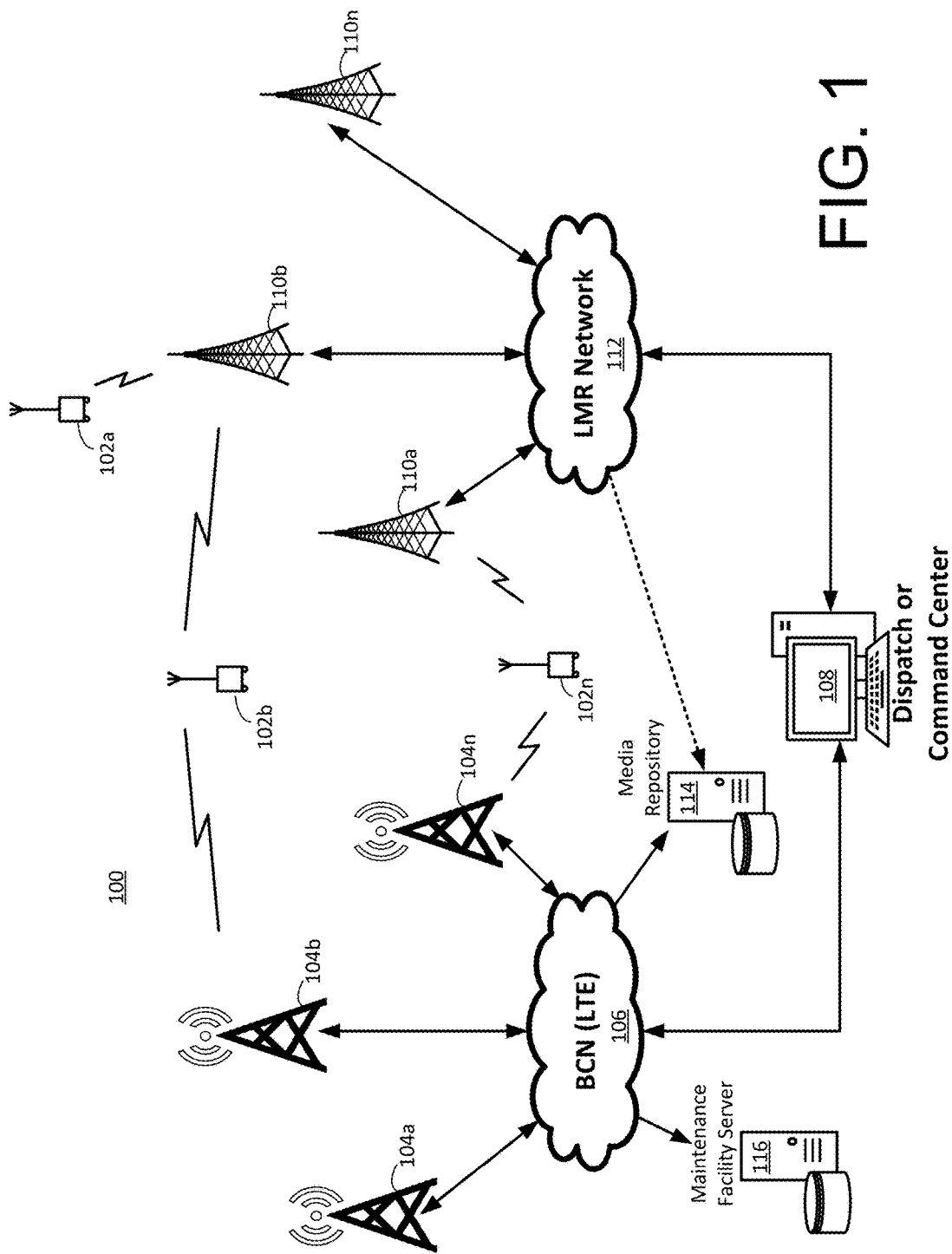
FIG. 1 is an illustration of an illustrative system implementing the present solution.

Referring now to FIG. 1, there is provided an illustrative system 100 which is useful for understanding the present solution. System 100 is a communication system in which a command or dispatch center 108 facilitates communications with and among a plurality of users operating mobile communication device (MCD) 102a, 102b, . . . 102n (collectively referred to herein as MCDs 102a-n). The dispatch center 108 can comprise one or more computer processing systems which may include at least one server computer. In order to both facilitate and coordinate communications between a dispatcher located at the dispatch or command center, and a plurality of MCDs 102a-n, the dispatch center can include a computer display screen in communication with a dispatch center server. The display screen can show status information concerning various MCDs. Such an arrangement is illustrated in FIG. 5.

Communications with and among the MCD 102a-n are facilitated through a first and second network. In an embodiment disclosed herein, the first network is an LMR network. The LMR network 112 can implement a conventional digital LMR communications system in accordance with any suitable digital LMR architecture. Examples of such digital architecture include systems constructed in accordance with the P25 or TETRA standard. Systems of this type are well-known in the art and therefore will not be described here in detail. However, it should be understood that the characteristics of a conventional digital LMR network are such that they are best suited for narrowband voice communications. The LMR network 112 will include one or more transceiver stations 110a, 110b, . . . 110n (hereinafter referred to as transceiver stations 110a-n) which facilitate a wireless link between the MCDs 102a-n and the LMR network.

Communications with and among the MCD 102a-n are also facilitated by means of a second network. The second network is a cellular broadband communication network (BCN) 106. The BCN 106 is a cellular network that is well suited for broadband wireless communications with a plurality of mobile users. For example, in some scenarios, the BCN can be based on a standard for high-speed wireless communication for mobile phones and data terminals based on the GSM/EDGE and UMTS/HSPA technologies. In some scenarios, a conventional LTE type network implementing 4G technologies can be used for the purpose of implementing the BCN. However, the solution is not limited in this regard and other high-speed broadband communications networks now known or known in the future can also be used for this purpose. The BCN 106 will include one or more base transceiver stations (BTSs) 104a, 104b, . . . 104n (hereinafter BTSs 104a-n) which facilitate a wireless link with the MCDs 102a-n and the BCN network.

In some scenarios, the MCDs 102a-n can capture audio and or video image data. This data can be communicated through BCN 106 to a command center 108 where it can be displayed to a dispatcher at a dispatch console and/or an incident commander at an incident command console. But in other scenarios, such audio and/or video image data can be stored in a media repository 114 so that it can be accessed for later use. Media repository 114 can comprise a media database server and a mass storage device (e.g. a magnetic disk drive) where the media data can be stored in a suitable format for later access and retrieval.

If the BCN 106 is an LTE type network it will implement a conventional LTE communication scheme by which users can send and receive broadband data. Such systems are well-known in the art and therefore will not be described here in detail. However, it is understood that the LTE network is particularly well suited for multimedia applications requiring low latency and high data throughput. Of course, the BCN 106 can also facilitate communications of relatively narrowband voice data.

Figure 2:
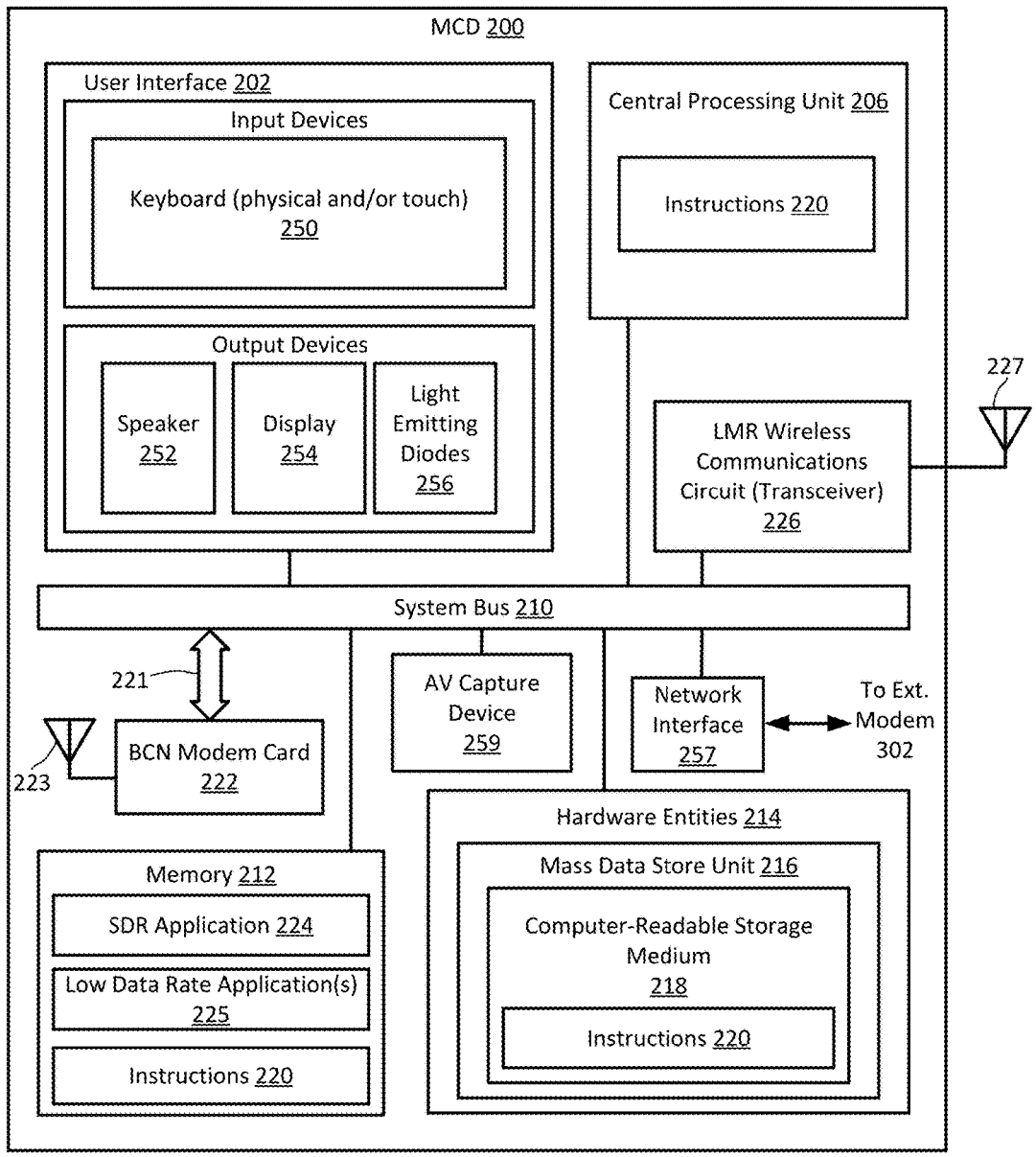
FIG. 2 is a block diagram of an illustrative architecture for a mobile communication device (MCD).

Referring now to FIG. 2, there is provided an illustration of an exemplary architecture for a MCD 200. The MCDs 102a-n in FIG. 1 are the same as or similar to MCD 200. As such, the discussion of MCD 200 is also sufficient for understanding the MCDs 102a-n of FIG. 1. MCD 200 may include more or less components than those shown in FIG. 2. However, the components shown are sufficient to disclose an illustrative solution disclosed herein. The hardware architecture of FIG. 2 represents one implementation of a MCD configured to facilitate certain aspects of a solution as disclosed herein.

Some or all the components of the MCD 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the MCD 200 comprises a user interface 202, a Central Processing Unit ("CPU") 206, a system bus 210, a memory 212 connected to and accessible by other portions of MCD 200 through system bus 210, and hardware entities 214 connected to system bus 210. The user interface can include input devices and output devices, which facilitate user-software interactions for controlling operations of the MCD 200. The input devices include, but are not limited, a physical and/or touch keyboard 250. The input devices can be connected to the MCD 200 via a wired or wireless connection (e.g., a Bluetooth® connection). The output devices include, but are not limited to, a speaker 252, a display 254, and/or light emitting diodes 256.

At least some of the hardware entities 214 perform actions involving access to and use of memory 212, which can be a Radom Access Memory ("RAM"), a disk drive and/or a Compact Disc Read Only Memory ("CD-ROM"). Hardware entities 214 can include a mass data store unit 216 (e.g. a disk drive, solid state memory or RAM) comprising a computer-readable storage medium 218 on which is stored one or more sets of instructions 220 (e.g., software code) configured to implement one or more of the methodologies, procedures, or functions described herein.

The instructions 220 can also reside, completely or at least partially, within the memory 212 and/or within the CPU 206 during execution thereof by the MCD 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the MCD 200 and that cause the MCD 200 to perform any one or more of the methodologies of the present disclosure.

The MCD 200 can further include an audio and/or video (AV) capture device 259. Such a device can comprise a video camera, microphone, and/or suitable coder to capture video images and/or audio. In other scenarios, such audio/video capture can be performed by hardware entities external of the MCD 200 in which case AV capture device 259 can be an interface for receiving audio and/or video data from an external AV device (not shown).

The MCD 200 can include one or more low data rate applications 225. These low data rate application(s) 225 can include one or more of text messaging applications, voice over IP (VoIP) applications, video over IP communication applications, form-based applications for submission of standardized forms, and report generating applications. Data communications for supporting such low-data rate applications can be facilitated by means of the BCN. The BCN is used for such purposes to alleviate congestion on the LMR network and since communication for such applications is often not considered mission critical.

The MCD 200 can include a conventional BCN modem card 222 which facilitates BCN connectivity for the MCD. BCN modem cards for LTE are well known in the art and therefore will not be described here in detail. However, it is understood that the BCN modem card will generally include all of the hardware and software necessary to facilitating broadband cellular communications between the MCD and the BCN. For example, the modem card can include radio frequency transceiver circuitry for bi-directional wireless communications with the BCN, demodulators, a digital baseband processor, and suitable decoding circuitry (not shown). One or more antennas 223 are provided to facilitate operations of the BCN modem.

In some scenarios (e.g., if the MCD 200 is a mobile radio installed in a vehicle) a separate modem module can be provided external of the MCD. Such an arrangement is shown in FIG. 3 where an external BCN modem module 302 can facilitate BCN communications (e.g. LTE) by means of a network interface 306 implementing a suitable network data protocol.

Figure 3:
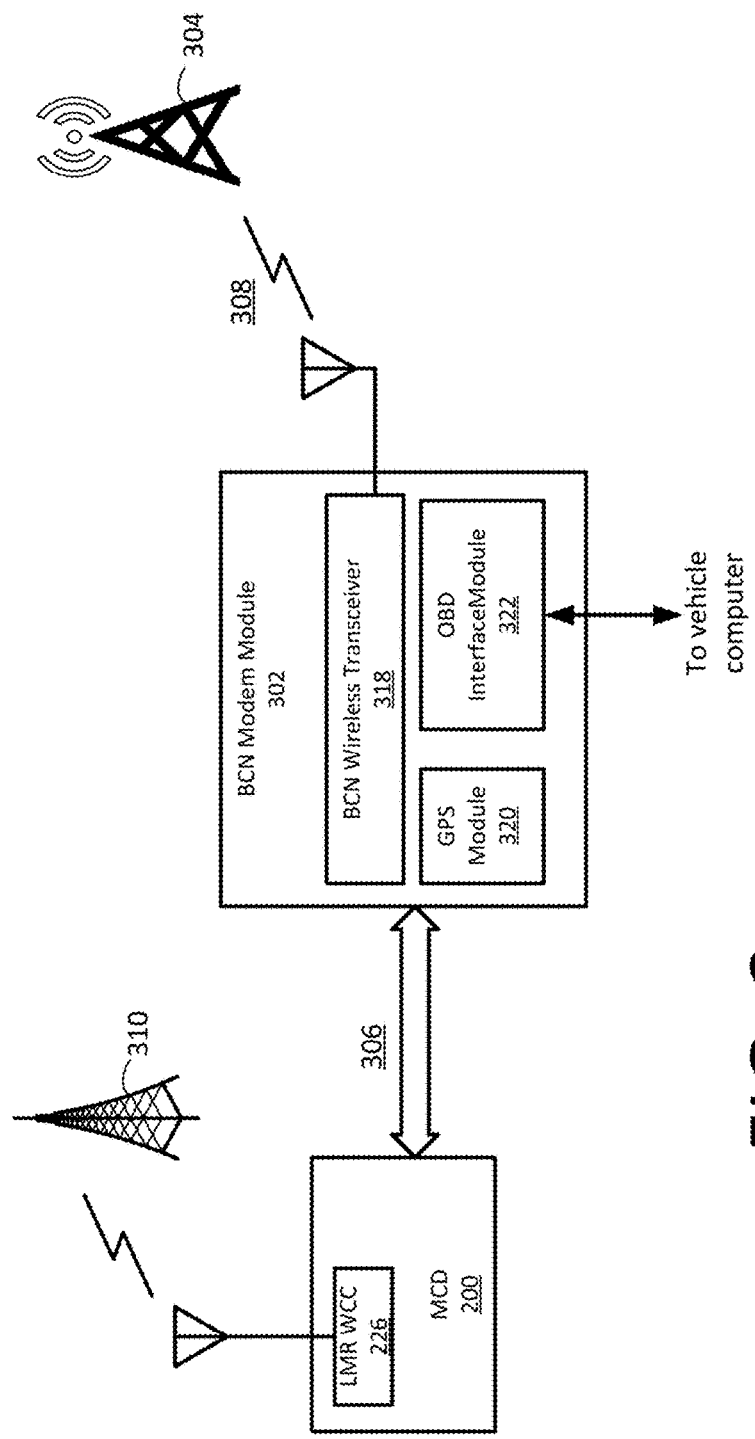
FIG. 3 is a block diagram that is useful for understanding how an external BCN modem module can communicate with a MCD.

The communication interface between the MCD 200 and the BCN modem card/module may be dependent in part on whether the BCN modem is an embedded card (i.e., BCN modem card 222) disposed in the MCD 200 as shown in FIG. 2, or is a separate BCN modem module 302 as shown in FIG. 3. For the case involving an embedded BCN modem card, the communication interface 221 could employ a communication protocol based on any of a variety of well-known interface protocols. For example, the interface protocol can be Ethernet (IEEE 802.3), Serial Universal Asynchronous Receiver-Transmitter (UART), Serial Peripheral Interface (SPI) Bus, Universal Serial Bus (USB), or an Inter-Integrated Circuit (I2C) bus.

Alternatively, if the LTE transceiver is external then a communication interface 306 could be implemented based on a wired or wireless communication standard such as Ethernet, USB, Bluetooth, or Wi-Fi (based on IEEE 802.11 standard). Of course, the various communication interface protocols which can be used for these purposes as described herein are not intending to be limiting. As such, the communication interface protocol used for the BCN modem card 222 and/or BCN modem module 302 can also include interface protocols other than those listed here.

The BCN modem module 302 can facilitate wireless communications with a base transceiver station 304 associated with a BCN as shown. This wireless interface 308 can operate in accordance with any suitable BCN air interface, such as an air interface defined for use in an LTE network. Exemplary BCN modem modules (e.g. LTE vehicle modem modules) that that can be used for this purpose are well-known in the art and therefore will not be described here in detail. If an external modem module 302 is used, the MCD 200 can include a digital data network interface 257 to facilitate data communications between the modem module and MCD 200.

A wireless LMR wireless communications circuit (WCC) 226 can facilitate communications with a transceiver station 310 of an LMR network. The WCC 226 facilitates wireless receive and transmit capability for communications with the LMR network. In some scenarios, a single wireless communication circuit 225 comprising a receiver and a transmitter (i.e., a radio transceiver) can perform these functions. In other scenarios, a separate wireless communication circuit 226 comprising a receiver/transmitter can be provided respectively for each of the LMR and BCN modes of communications. One or more antennas 227 are provided to facilitate operations of the LMR wireless communications circuit. According to one embodiment, the WCC can be configured for wireless communications in accordance with a P25 or TETRA wireless interface standard.

At least some of the functionalities associated with LMR wireless communications can be facilitated by hardware entities other than the WCC 226. In some scenarios, an electronic circuit (e.g., central processing unit 206) is programmed for facilitating the implementation of a software defined radio (SDR). The SDR can be programmed so that it is capable of carrying out at least some of the signal processing functions required of the MCD 200 for LMR communications. In this regard, it should be understood that the electronic circuit can access and run an SDR application 224 installed on the MCD 200.

With the interface and communication protocol described herein, the BCN modem 222/302 can periodically report to the MCD 200 the status of the BCN connection. This BCN status information can then be reported back to a dispatch console or other control center using LMR connectivity so that dispatchers will know the status of BCN connectivity at each MCD 200. The unavailability of BCN broadband coverage at one or more MCDs 200 is extremely important tactical information, and this information is not currently accessible to incident commanders and/or dispatchers when the BCN network connectivity fails. The solution presented herein leverages the high value, high reliability LMR network to provide valuable situational awareness information to the incident commander or dispatcher based on the availability of the network with the best connectivity.

As shown in FIG. 3, a BCN modem module 302 can include a BCN wireless transceiver 318 to facilitate BCN communications, such as LTE. The modem module can also include a Global Positioning System or GPS module 320 to determine a location of a vehicle in which a mobile MCD 200 is installed. When BCN connectivity is available, this GPS information is wirelessly communicated by means of the BCN wireless transceiver 318, to a base transceiver station 304. From there, the information can be communicated to a dispatch center (e.g. a dispatch center 108) using the BCN network. Likewise, the BCN modem module 320 can include an OBD interface 322 (e.g. an OBD-II interface) for receiving vehicle diagnostic and status information. When BCN connectivity is available, this vehicle status information is communicated by means of the BCN wireless transceiver 318, to the base transceiver station 304, and then to a dispatch center or maintenance facility server (e.g. maintenance facility server 116).

But when BCN connectivity is unavailable, the MCD 200 can use the LMR communication link temporarily for various other functions which are normally facilitated by BCN modem 222/302. For example, the LMR connectivity can be used to facilitate communications for lower data rate applications 225 which are offered on the MCD 200. These lower data rate applications 225 can include one or more of text messaging, voice over IP (VoIP), and video over IP communication applications. The LMR connectivity can also be used to support lower data rate applications for submission of forms and reports. Further, in those instances where the modems 222/302 also provide GPS status and/or OBD-II vehicle status, such information can be communicated to the MCD which would then use the LMR link to report the information back to commanders or dispatchers. Accordingly, MCD 200 can then use its LMR capability to function as a fallback whenever BCN connectivity is not available. One or more of these features can be implemented in scenarios where the MCD is implemented as a mobile unit in a vehicle and/or a portable device carried by the user.

Referring now to FIGS. 4A and 4B (collectively FIG. 4), there is shown a flowchart which is useful for understanding certain aspects of the solution presented herein. The operations described in the flowchart will generally involve actions performed by at least one processor in the MCD (e.g., CPU 206). The process begins at 402 and then continues at 404 where actions are taken to initialize the MCD (e.g., MCD 200) in preparation for a communication session. This initialization can involve various steps, depending on a particular implementation of a MCD. For example, initialization can involve loading certain software from memory and beginning execution of an SDR application suitable for digital LMR communications.

The initialization of the MCD 400 can further include an initialization of an LMR communication session at 406. Initialization of the communication session can involve various operations, depending on the particular digital LMR communication protocol in use. For example, if the LMR communication protocol to be used is P25, the MCD can register with the LMR network to determine whether the MCD is authorized to communicate on the network, and the site location of the subscriber. As part of the registration process, a trunking controller for the LMR network can assign the MCD a Working Unit ID (WUID) and a Working Group ID (WGID). These P25 trunking controller will maintain a database of the WUID and WGID values assigned to each MCD 200

At 408 a determination is made as to whether the LMR communication capability has been established and is available. If, for any reason, the LMR communication capability has not been established, then the MCD 200 can return to 406 where it will once again attempt to establish an LMR communication session. If an LMR communication session has been successfully established then the process continues on to 410 where the MCD will continue with one or more LMR communication sessions. For example, in a scenario involving a conventional P25 LMR network, such a communication session can involve monitoring of a control channel until a traffic channel is requested on the basis of a push-to-talk PTT (switch) assertion by the user. Receiving a grant of a traffic channel from a trunking controller, and bi-directional narrowband voice communications with a dispatch operator or other MCDs through the trunking LMR system. The system can periodically check to determine whether the user has terminated LMR operations (e.g. by powering down the MCD 200). If so (412: Yes), then the LMR session will terminate at 414 or perform other processing. Otherwise (412: No) the MCD will continue with normal LMR communications at 410.

A BCN communication session can be initialized concurrently or serially with the initialization of the LMR communication session. FIG. 4A shows a concurrent initialization but it should be understood that the embodiments are not limited in this regard. The initialization of the BCN communications session begins at 416. The various steps involved with establishing a BCN communication session are well known. Accordingly, a complete discussion of the steps involved with initialization of a BCN session is beyond the scope of this disclosure. However, in the case of an LTE session the process will usually involve the Radio Resource Control layer establishing a connection between the MCD and the Base Transceiver Station (which is commonly referred to as the eNodeB in an LTE context). This connection establishment is followed by attachment of the MCD to the LTE Core Network and authentication of the MCD to the network. A Mobility Management Entity (MME) and Servicing Gateway (SGW) will establish a context for the MCD. Thereafter, a default bearer for data transfer is established at the MCD, eNodeB, SGW, and Packet Data Network Gateway. Upon completion of these steps, a user data communication session can begin.

At 418 the MCD can verify that BCN connectivity is available. This can be accomplished by communicating with the BCN modem to verify that BCN connectivity has been successfully established. For example, in a case where the BCN modem is an LTE modem, it can periodically report to the MCD whether or not it has an LTE network connection. The BCN modem can also report to the MCD a Received Signal Strength Indication (RSSI) value to indicate the signal strength of the LTE network signal. The foregoing information can be reported to the MCD using a suitable network interface. For example, in the arrangement shown in FIG. 2, a network interface 221 can be used to facilitate such communications. Similarly, in the arrangement shown in FIG. 3, a network interface 306 can be provided for this purposes. Suitable network interfaces for this purpose are discussed below in greater detail. Thereafter, the MCD 200 can use a base transceiver (e.g. one or more of transceivers 110a-110b) and the LMR network (e.g. LMR network 112) to report the LTE connection status to a dispatch or command center. As explained below, such reporting can be automatic at predetermined intervals, or can occur on an as needed basis (e.g., whenever a loss of BCN connectivity is detected).

Once BCN connectivity has been established, the process continues at 420 in accordance with a conventional BCN communication session. For example, this step can involve accessing network-based media and web pages, text messaging, voice over IP (VoIP), and video over IP communication applications. The BCN connectivity can also be used to support lower data rate applications for submission of forms and reports. In some scenarios, the BCN connectivity can facilitate communication of MCD GPS location information and/or OBD vehicle diagnostic data to a repair facility. The system can periodically check to determine whether the user has terminated BCN operations (e.g. by powering down the BCN modem 222/302 or MCD 200). If so (422: Yes), then the BCN session will terminate at 422 or the system can perform other processing. Otherwise (422: No) the MCD will continue with normal BCN data communications at 420.

In many instances, system signal coverage is different for a LMR network as compared to a BCN. Consequently, there will be times when a MCD 200 has LMR signal coverage in a particular geographic location, but may not have BCN signal coverage. Accordingly, in step 418 there will be times when the LMR network connectivity is available, but BCN connectivity is not available (418: No). In such a scenario, the process in FIG. 4 will continue at 426 where the MCD will use the LMR network to report unavailability of BCN connectivity.

In some scenarios, a processing element (e.g., CPU 206) in the MCD 200 can monitor the RSSI value received from the BCN modem. When the RSSI value falls below a predetermined threshold indicating loss of BCN connectivity, the MCD can use this occurrence as an indication that the BCN network is not available. This determination can be used to trigger the MCD 200 to report BCN network status information using the LMR network. Alternatively, or in addition to such triggered reporting, the MCD can periodically report connectivity status of a BCN modem associated with BCN network communications.

In some scenarios, a BCN modem can make a BCN connectivity evaluation independently of the MCD. In such a scenario, the BCN modem module 302 or modem card 222 can detect the RSSI or some other measure of connectivity (e.g. bit error rate). The BCN modem can then report to the MCD whenever BCN connectivity is lost. Alternatively, the BCN modem can communicate BCN network communication status to the MCD on a periodic basis to indicate whether or not BCN connectivity exists.

The BCN modem will communicate a notification message or report to the MCD 200 to indicate when connectivity has been lost. The MCD 200 can respond to such indication by using the LMR network. In particular, this connectivity report can be communicated as a data communication through the conventional LMR network 112 to a dispatch console 108 or incident command console. As shown in FIG. 5, this connectivity status information can then be displayed to an incident commander or dispatch operator on an incident command and/or dispatch console. For example, in the scenario shown in FIG. 5, a set of subscribers ID1, ID2, ID3 and ID4 are normally in communication with an LMR network and a BCN network, but subscriber unit ID3 has lost BCN connectivity. Accordingly, an incident command console can display information showing that subscribers ID1, ID2, and ID4 all have BCN connectivity, whereas subscriber ID3 does not have BCN connectivity. This information can be very useful for tactical operations and in other scenarios.

The process can continue in one or more of steps 428-436 which are optional. For example, in step 428 the process can continue with the MCD utilizing the LMR network for one or more lower data rate applications that would normally rely on BCN connectivity for their operation. For example, these lower data rate applications can include IP voice/data communications, text messaging, accessing forms, and submission of reports. In some scenarios, this data can include IP video data from body cameras. When conditions are such that BCN connectivity is unavailable, the MCD can also access data from web pages using the LMR connectivity.

At 430 the MCD can optionally receive GPS location data from an BCN modem module that is normally communicated back to a dispatch console using the BCN. This location data can be communicated to a dispatch console or incident commander using the LMR network. At 432 the MCD can similarly receive vehicle OBD data (e.g., OBD-II data) that is communicated to the BCN modem from a vehicle computer. This vehicle diagnostic data can be communicated to a dispatch console, incident command console, or to a maintenance facility.

In some scenarios, it may not be desirable for the MCD to use the LMR network for applications involving communication of large amounts of data. For example, an AV capture device 259 provided in the MCD 200 can be used directly or indirectly to capture voice or video data. Accordingly, a determination is made at 434 as to whether media (e.g., audio/video media) has been captured. If so, then in the absence BCN connectivity the MCD 200 can store such audio/video content in a memory location within the MCD. This step can help avoid causing excessive congestion on the LMR network.

The process then continues on to 438 where the MCD or the BCN modem can attempt to re-initialize a BCN communication session. Such attempts are advantageously handled by the Radio Resource Control layer in the BCN modem. If the attempt is not successful and the BCN remains unavailable (440: No) then the process can return to 426 and the process repeats. However, if the BCN connectivity is restored (440: Yes) then the process continues on to 442. At 442 the audio/video content stored in memory at 436 can be streamed to an audio/video data repository (e.g., media repository 114) using the BCN. Alternatively, the audio/video data can be streamed to a dispatch console or incident command console located at a command center. The process then returns to 420 where normal BCN processing is resumed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for monitoring an operational capability of a mobile communication device (MCD) in a network, comprising:
    using a land mobile radio (LMR) transceiver implementing a LMR wireless communication protocol to facilitate at least narrowband voice communications for the MCD through an LMR network when communicating with a remote dispatch center;
    using a broadband cellular network (BCN) modem in communication with the MCD for implementing a BCN wireless communication protocol to facilitate at least broadband data communications between the MCD and the remote dispatch center;
    determining a BCN access interruption wherein the broadband data communication through the BCN is temporarily not possible for the MCD; and responsive to the determining, automatically communicating from the MCD to the remote dispatch center a notification of the BCN access interruption, by using the LMR network.

2. The method according to claim 1, further comprising automatically temporarily storing in a data store accessible to the MCD at least one of audio and video media data that has been received by the MCD, under conditions of the BCN access interruption.

3. The method according to claim 2, further comprising automatically communicating the at least one of audio and video media data that has been stored at the MCD when data communication capability through the BCN is restored.

4. The method according to claim 1, further comprising:
using the BCN to facilitate data communications necessary for at least one low data rate MCD application when the BCN is accessible to the MCD;
automatically using the LMR network to facilitate data communications for the at least one low data rate MCD application upon occurrence of the BCN access interruption.

5. The method according to claim 4, wherein the at least one low data rate MCD application is selected from the group consisting of an IP voice application, an IP video application, a text messaging application, a form generator application, and a report generator application.

6. The method according to claim 1, further comprising selectively using the LMR network in place of the BCN network to report GPS location information to the remote dispatch center under a condition where the BCN access interruption has occurred.

7. The method according to claim 1, further comprising selectively using the LMR network in place of the BCN network to report vehicle on-board diagnostic data to at least one remote maintenance facility server under a condition where the BCN access interruption.

8. The method according to claim 1, further comprising displaying information concerning the occurrence of the BCN access interruption on a display screen at a dispatch center responsive to receiving the notification.

9. The method according to claim 1, wherein the LMR wireless communication protocol is selected from the group consisting of P25 and TETRA.

10. The method according to claim 9, wherein the BCN wireless communication protocol is LTE.

11. The method according to claim 1, wherein the LMR wireless communication protocol is a trunking type communication system.

12. A mobile communication device (MCD), comprising:
at least one land mobile radio (LMR) wireless communication circuit configured for implementing an LMR wireless communication protocol; and
at least one electronic processor configured to utilize the at least one LMR wireless communication circuit to:
facilitate at least narrowband voice communications for the MCD through an LMR network when communicating with a remote dispatch center;
use a broadband cellular network (BCN) wireless modem in communication with the MCD for implementing a BCN wireless communication protocol to facilitate at least broadband data communications between the MCD and the remote dispatch center;
determine an occurrence of a BCN access interruption wherein the broadband data communication through the BCN wireless modem is temporarily not possible for the MCD; and
responsive to the determining, automatically cause the MCD to communicate to the remote dispatch center a notification of the BCN access interruption, by using the LMR network.

13. The MCD according to claim 12, wherein the at least one electronic processor is further configured to automatically selectively cause at least one of audio and video media data that has been received by the MCD to be temporarily stored in the MCD under conditions of the BCN access interruption.

14. The MCD according to claim 13, wherein the at least one electronic processor is further configured to automatically selectively cause the at least one of audio and video media data that has been stored at the MCD to be communicated using the BCN wireless modem when it determines that BCN access through said BCN wireless modem has been restored.

15. The MCD according to claim 12, wherein the at least one electronic processor is further configured to cause the MCD to:
use the BCN wireless modem to facilitate data communications necessary for at least one low data rate MCD application executing on the MCD when the BCN is accessible to the BCN wireless modem;
selectively use the LMR network to facilitate data communications for the at least one low data rate MCD application upon occurrence of the BCN access interruption.

16. The MCD according to claim 15, wherein the at least one low data rate MCD application is selected from the group consisting of an IP voice application, an IP video application, a text messaging application, a form generator application, and a report generator application.

17. The MCD according to claim 12, wherein the at least one electronic processor is further configured to selectively cause the at least one LMR wireless communication circuit to report GPS location information of the MCD to the remote dispatch center under a condition where the BCN access interruption has occurred.

18. The MCD according to claim 12, wherein the at least one electronic processor is further configured to cause the at least one LMR wireless communication circuit to report vehicle on-board diagnostic data to at least one remote maintenance facility server under a condition where the BCN access interruption has occurred.

19. The MCD according to claim 12, wherein the LMR wireless communication protocol is selected from the group consisting of P25 and TETRA.

20. The MCD according to claim 19, wherein the BCN wireless communication protocol is LTE.

* * * * *